June 16, 1936.                B. G. CARLSON                2,044,150
                              ARTIFICIAL HORIZON
                              Filed May 4, 1932              2 Sheets-Sheet 1

INVENTOR
BERT G. CARLSON.
BY
ATTORNEY.

June 16, 1936.   B. G. CARLSON   2,044,150
ARTIFICIAL HORIZON
Filed May 4, 1932   2 Sheets-Sheet 2
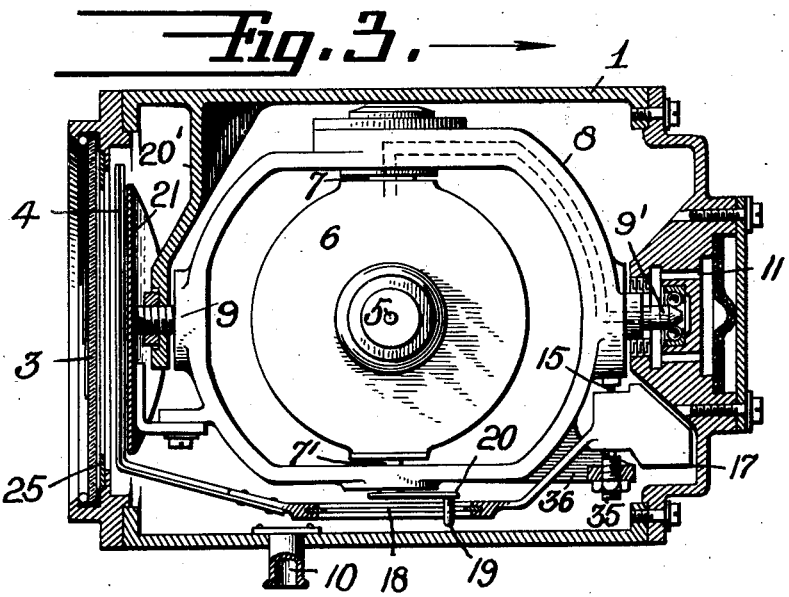
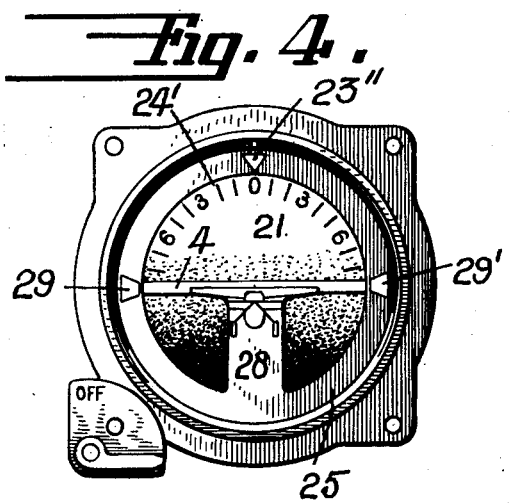
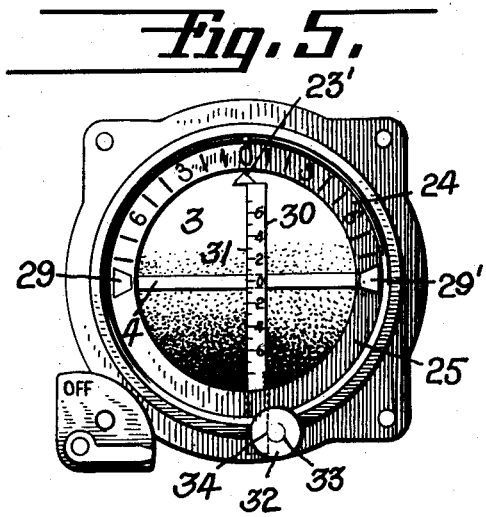
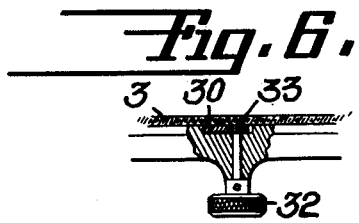
INVENTOR
BERT G. CARLSON.
BY Herbert H. Thompson
his ATTORNEY.

Patented June 16, 1936

2,044,150

UNITED STATES PATENT OFFICE 2,044,150

ARTIFICIAL HORIZON

Bert G. Carlson, Queens Village, N. Y., assignor to Sperry Gyroscope Company, Inc., Brooklyn, N. Y., a corporation of New York Application May 4, 1932, Serial No. 609,195

8 Claims. (Cl. 33—204)

This invention relates to gyroscopic level indicating devices especially adapted for aircraft and of the type usually known in the art as artificial horizons. In this particular type of instrument the apparent movements of the horizon with respect to the craft are simulated on the face of the instrument so that the aviator may fly blind by the instrument in the same manner as when flying in full view of the real horizon so that no likelihood of confusion or misinterpretation of the reading of the instrument is likely to occur. An example of this type of instrument is shown in my prior application now Patent No. 1,982,636, dated December 4, 1934, for Air driven gyro verticals, the present application being the continuation in part of said prior application. One of the objects of the present invention is to improve upon such artificial horizons by incorporating therein a graduated scale for showing at least the angle of tilt or bank of the plane. In addition I may also show the angle of pitch or climb of the plane, all on the same face of the instrument.

Referring to the drawings showing several forms of the invention,

Fig. 3 is a horizontal section through the casing of the instrument on approximately line 3—3 of Fig. 1.

Fig. 4 is a face of a modified form of banking scale for the instrument.

Fig. 5 shows a still further modification in which a degree of pitch or climb is shown in addition to the degree of tilt or bank.

Fig. 6 is a detail of the same.

Figure 1:
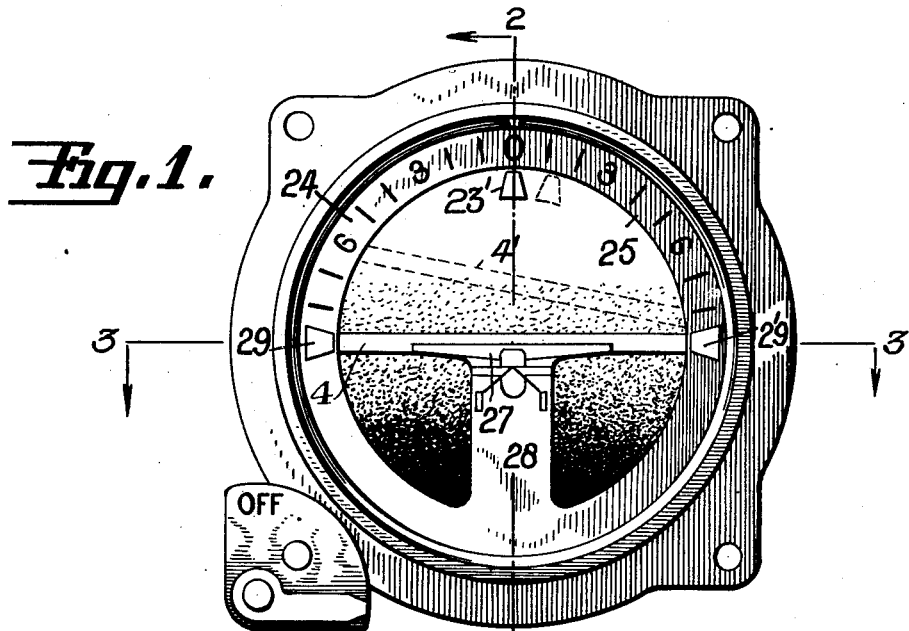
Fig. 1 is a face view of an artificial horizon with my invention incorporated therein.

As now constructed, my device comprises a closed casing or housing 1 which houses the gyro vertical 2. The casing at its front is provided with a glass window 3 through which the artificial horizon indicating bar 4 is visible. Normally the bar 4 is read in connection with the reference marking 27 on the face of the instrument which may appear in the form of a miniature airplane engraved on upwardly extending portion 28 from the bezel ring 25. Said ring may also be provided with additional index pointers 29 and 29' against which the bar 4 may be read.

The gyroscope is shown as universally mounted within the housing on a vertical spinning axis 5 within its rotor bearing casing or frame 6. Said casing in turn is journalled for oscillation in horizontal bearings 7, 7' in a gimbal ring 8, which in turn is journalled for oscillation in horizontal bearings 9, 9' at right angles to bearings 7, 7'. With the aircraft headed in the direction of the arrow in Fig. 3, the major axis bearings 9, 9' are fore and aft and the minor axis bearings 7, 7' athwartships. The forward bearing 9 is shown as supported in a bracket 20' extending laterally from the casing 1, the horizon bar being in front of the pivot and bracket.

The gyro may be air spun as shown in my aforesaid prior application, air being continuously exhausted from the case through the pipe 10 by means not shown and air being let into the gyroscope through the passages 11 in the outer bearing 9' and from thence through the gimbal ring 8 and hollow bearing 7 to a jet or jets (not shown) in the gyro casing. The gyroscope is preferably of the non-pendulous or balanced type, the gyroscope being erected by the reaction of air jets emerging through apertures 12 in downward extension 13 of the gyro case, which are controlled by pendulous shutters 14 in the manner described in the aforesaid application.

Figure 2:
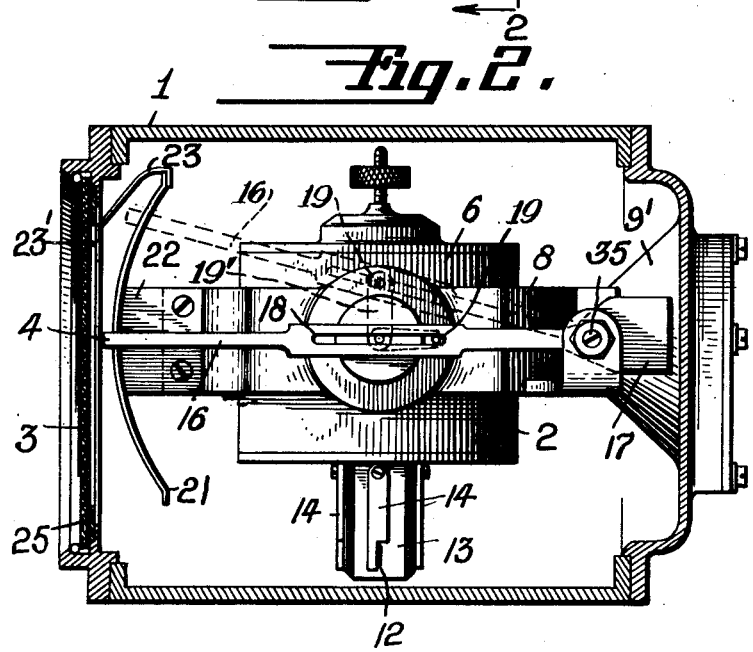
Fig. 2 is a vertical section through the casing or housing of the gyroscopic horizon on approximately line 2—2 of Fig. 1, the gyroscope being shown in side elevation.

The horizon bar 4 is shown as connected to the gyroscope so that it is moved bodily up and down for pitching, diving and climbing of the craft and is turned or tilted laterally for tilting or banking of the craft. As shown, said bar forms a forward extension or bent arm of a long lever 16 pivoted on a pivot pin 15 journaled at the rear and to one side of the gimbal ring 8 between a set screw 35 in bracket 36 on ring 8 and the body of the ring. Said lever may be counter-balanced by a comparatively heavy mass 17 and is provided near its center with a horizontal slot 18 into which projects a pin 19 on an arm 20 secured to horizontal trunnion 7' on the gyro case 6 or other eccentric mounted to tilt with the rotor bearing casing. Therefore, when the aircraft pitches downwardly (for instance) with respect to the gyroscope, the pin 19 is moved up causing a corresponding and magnified upward movement of the bar 4. At the same time, since the lever 16 is mounted as a whole on gimbal 8, it partakes of the apparent tilting movement of the gyroscope about fore and aft axis 9, 9' and, therefore, upon tilting movement of the craft (counter-clockwise, for instance, in Fig. 1) the bar will be tilted clockwise. The dotted position, as shown at 4' in Fig. 1, the bar being both tilted and moved upwardly, shows that the aircraft has the left wing low and that it is diving downwardly, the horizon bar having apparently moved upwardly and being tilted clockwise. It should be observed that with this construction not only is the horizon bar moved in the same direction as the real horizon appears to move on pitching of the craft, but also that the pitching movement is magnified near the horizontal position and at the same time decreased for larger angles. In fact, as shown in Fig. 2, the horizon bar cannot be moved to a greater than a predetermined angle determined by the length of the crank arm or eccentric 19', so that the horizon bar preferably never moves out of the field of vision determined by the window 3, regardless of the angle at which the plane is diving. Also, it should be observed that there are no parts to strike, regardless of the angle of dive, whereby looping the loop or somersaulting may be effected without upsetting the gyroscope.

In order to conceal the gyroscope and pivot 9 and give the semblance of the sky behind the horizon bar 4, I have shown a mask 21 which is preferably of cylindrical form as shown in Fig. 2. Said mask is preferably secured to the gimbal ring 8 as by means of a bracket 22 so that the mask is turned with the bar and there is no danger of the supporting lever 16 striking the support for the mask. Since the mask is turned with the gyroscope, it furnishes a ready means for showing the degree of tilt. For this purpose I have shown secured to the top of the mask a finger or pointer 23 which extends forwardly and downwardly to form an index 23' readable on a graduated scale 24 which may be placed on the bezel ring 25 around the face of the instrument. When the craft tilts, therefore, the index 23' will move over the scale 24 to indicate the exact angle of tilt or, in other words, to shown the exact angle at which the bar 4 is tilted regardless of its pitching movement.

In addition I may provide a means for showing the degree of pitch or climb of the craft. The face of such an instrument is shown in Fig. 5. According to this arrangement a vertical scale 30, which is preferably made of transparent material, is provided on the face of the instrument. Preferably the one edge 31 of said scale bisects and is perpendicular to the bar 4 in its normal horizontal position. Therefore, by reading the upper edge of the bar 4 against the left hand graduated edge 31 of the scale, the degree of pitch or climb may be determined accurately without reference to the lateral tilting of the bar 4. Preferably the scale 30 is vertically adjustable so that it may be set to zero for different loadings of the craft. To this end I show an adjusting knob 32 journaled at the base of the instrument which turns a small pinion 33 on the shaft thereof. Said pinion meshes with rack teeth 34 cut on the outer edge of scale bar 30 so that the zero point of scale 30 may be adjusted to suit the loading conditions.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

One such obvious modification is to interchange the reference pointer and scale which indicate the degree of lateral inclination, as indicated in Fig. 4, in which the scale 24' is placed on mask 21 and the index 23'' on the bezel ring 25.

Having described my invention, what I claim and desire to secure by Letters Patent is:

1. In a gyro vertical for aircraft, the combination with a gyroscope mounted on the craft for oscillation about a major fore and aft and a minor transverse axis and a housing therefor, of a normally horizontal bar connected to said gyroscope about both said axes so as to be moved up and down upon pitching of the craft and to be tilted upon banking of the craft, both movements being in the same direction as the real horizon appears to move under like conditions, a mask to the rear of said bar and connected to said gyro to tilt only about said fore and aft axis, and cooperating graduated indicating means for showing the degree of bank on said mask and a fixed part of said housing.

2. In a gyro vertical for aircraft, the combination with a gyroscope mounted on the craft for oscillation about a major fore and aft and a minor transverse axis and a housing therefor, of a single indicator connected to said gyroscope about both said axes so as to be moved up and down upon pitching of the craft and to be tilted upon banking of the craft, a mask to the rear of said bar and connected to said gyro to tilt only about said fore and aft axis, and cooperating graduated indicating means for showing the degree of bank on said mask and a fixed part of said housing.

3. In a gyro vertical for aircraft, the combination with a gyroscope mounted on the craft for oscillation about a fore and aft and transverse axis and a housing therefor, of a normally horizontal bar connected to said gyroscope about both said axes so as to be moved up and down upon pitching of the craft and to be tilted upon banking of the craft, cooperating means separate from said bar, one part of which is angularly graduated, for separately showing the degree of lateral tilt of said bar, and graduated means for separately showing the degree of up and down movement of said bar.

4. In an artificial horizon for airplanes, a gyroscope, a gimbal ring mounting therefor having its major axis trunnions fore and aft of the airplane and minor axis trunnions lateral, a lever pivoted on said gimbal ring about an axis normally parallel to said minor axis and to the rear thereof, a normally horizontal indicator bar mounted at the forward end of said lever and a crank arm on said minor axis trunnion beyond said gimbal ring slidably engaging said lever whereby said indicator bar is moved up and down relative to the airplane upon pitching of the same and tilts laterally upon rolling of the same.

5. In an artificial horizon for airplanes, a gyroscope, a gimbal ring mounting therefor having its major axis trunnions fore and aft of the airplane and minor axis trunnions lateral thereof, at least one of said last named trunnions extending through said gimbal, a lever having a normally horizontal slot pivoted on said gimbal ring about an axis normally parallel to said minor axis and to the rear thereof, a normally horizontal indicator bar mounted at the forward end of said lever and a crank arm on the last named trunnion beyond said ring and engaging a normally horizontal slot in said lever, said slot being long enough to permit apparent somersaulting of the gyroscope, whereby said indicator bar is moved up and down relative to the airplane upon pitching of the same and tilts laterally for rolling of the same.

6. In an artificial horizon for aircraft, a universally mounted, normally horizontal indicating member representing the horizon, means for causing the same to move in the same direction as the real horizon appears to move on both tilting and pitching of the craft, graduated means for showing the degree of tilt of said member, and separate graduated means for showing the degree of pitch of said member.

7. In an artificial horizon for airplanes, a gyroscope, a gimbal ring mounting therefor having its major axis trunnions fore and aft of the airplane and minor axis trunnions lateral, a lever pivoted on said gimbal ring about an axis normally parallel to said minor axis and forwardly thereof, a normally horizontal indicator bar mounted at the rear end of said lever, and eccentric means on the minor axis trunnion of said gyroscope adjacent said lever and outside said gimbal and normally lying horizontal, said lever having a normally horizontal slot engaged by said eccentric, whereby the movements of said bar are magnified for small pitch angles, but said bar is never moved beyond a predetermined height or depression when the craft loops.

8. In an artificial horizon for airplanes, a gyroscope, a gimbal ring mounting therefor having its major axis trunnions fore and aft of the airplane and minor axis trunnions lateral, a lever pivoted on said gimbal ring about an axis normally parallel to said minor axis and forwardly thereof, a normally horizontal indicator bar mounted at the rear end of said lever, and eccentric means on the minor axis trunnion of said gyroscope adjacent said lever and outside said gimbal and normally lying horizontal, said lever having a normally horizontal slot engaged by said eccentric and of greater length than the throw of said eccentric, whereby looping the loop or somersaulting may be effected without upsetting the gyroscope.

BERT G. CARLSON.